(12) United States Patent
Yamasaki et al.

(10) Patent No.: US 12,277,778 B2
(45) Date of Patent: Apr. 15, 2025

(54) VEHICLE WITH ROAD SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/430,495

(22) Filed: Feb. 1, 2024

(65) Prior Publication Data

US 2024/0386727 A1 Nov. 21, 2024

(30) Foreign Application Priority Data

Feb. 14, 2023 (JP) .................................. 2023-021177

(51) Int. Cl.
*G06V 20/56* (2022.01)
*B60Q 1/00* (2006.01)
(Continued)

(52) U.S. Cl.
CPC .............. *G06V 20/588* (2022.01); *B60R 1/24* (2022.01); *G06V 10/60* (2022.01); *G06V 20/58* (2022.01);
(Continued)

(58) Field of Classification Search
CPC .. B60Q 2400/50; B60Q 2400/00; B60Q 1/50; B60Q 1/46; B60Q 1/503; B60Q 1/506; B60Q 1/52; B60Q 1/34; B60Q 1/343; B60Q 1/04; B60Q 1/247; B60Q 1/245; B60Q 1/143; B60Q 1/1423; B60Q 1/26; B60Q 1/525; B60Q 9/008; G06V 10/60; G06V 20/56; G06V 20/58; G06V 20/582;
(Continued)

(56) References Cited

U.S. PATENT DOCUMENTS

| | | | |
|---|---|---|---|
| 10,134,283 B2 | 11/2018 | Masuda et al. | |
| 2014/0036080 A1* | 2/2014 | Schut | H04N 7/18 348/148 |

(Continued)

FOREIGN PATENT DOCUMENTS

| | | |
|---|---|---|
| JP | 2015-164828 A | 9/2015 |
| JP | 2016-055691 A | 4/2016 |
| JP | 2020-111284 A | 7/2020 |

*Primary Examiner* — Nathnael Aynalem
(74) *Attorney, Agent, or Firm* — Rimon P.C.

(57) ABSTRACT

A vehicle with a road surface rendering function includes a projection member, a controller, and an external camera. The projection member is configured to project light for road surface rendering from the vehicle that is traveling to render a road surface rendered image on a road surface around the vehicle. The controller is configured to control light projection for the road surface rendering by the projection member. The external camera provided on the vehicle and configured to capture an image of the road surface so that the image includes surroundings of the road surface rendered image. The controller is configured to suppress the light projection from the projection member for the road surface rendered image by making determination on a road surface reflection state based on the image captured by the external camera.

7 Claims, 6 Drawing Sheets

(51) Int. Cl.
*B60R 1/24* (2022.01)
*G06V 10/60* (2022.01)
*G06V 20/58* (2022.01)
*H05B 47/125* (2020.01)

(52) U.S. Cl.
CPC ......... *H05B 47/125* (2020.01); *B60Q 1/0017* (2013.01); *B60R 2300/308* (2013.01); *G06V 2201/08* (2022.01)

(58) Field of Classification Search
CPC .... G06V 20/588; G06V 20/62; B60R 1/1207; B60R 1/26; B60R 2300/804; G06T 5/20
USPC ......................................................... 348/148
See application file for complete search history.

(56) References Cited

U.S. PATENT DOCUMENTS

| | | | |
|---|---|---|---|
| 2014/0062685 A1* | 3/2014 | Tamatsu ................. | G08G 1/005 340/425.5 |
| 2018/0253609 A1* | 9/2018 | Potter ...................... | B60Q 1/08 |
| 2019/0009714 A1* | 1/2019 | Sakata ................... | B60Q 1/503 |
| 2019/0389368 A1* | 12/2019 | Yasuda ................... | B60Q 1/50 |
| 2019/0389370 A1* | 12/2019 | Kawaguchi .............. | B60Q 1/50 |
| 2021/0309145 A1* | 10/2021 | Kurebayashi .......... | B60K 35/80 |

* cited by examiner

VEHICLE WITH ROAD SURFACE RENDERING FUNCTION

CROSS-REFERENCE TO RELATED APPLICATIONS

The present application claims priority from Japanese Patent Application No. 2023-021177 filed on Feb. 14, 2023, the entire contents of which are hereby incorporated by reference.

BACKGROUND

The disclosure relates to a vehicle with a road surface rendering function.

Japanese Unexamined Patent Application Publication Nos. 2016-055691, 2020-111284, and 2015-164828 disclose that various patterns are rendered on a road surface where a vehicle is traveling by projecting light from the vehicle.

By rendering those patterns on the road surface, the vehicle can provide, for example, a driver who drives the vehicle with information on traveling of the vehicle via the road surface.

SUMMARY

An aspect of the disclosure provides a vehicle with a road surface rendering function. The vehicle includes a projection member, a controller, and an external camera. The projection member is configured to project light for road surface rendering from the vehicle that is traveling to render a road surface rendered image on a road surface around the vehicle. The controller is configured to control light projection for the road surface rendering by the projection member. The external camera is provided on the vehicle and configured to capture an image of the road surface so that the image includes surroundings of the road surface rendered image. The controller is configured to suppress the light projection from the projection member for the road surface rendered image by making determination on a road surface reflection state based on the image captured by the external camera.

An aspect of the disclosure provides a vehicle with a road surface rendering function. The vehicle includes a projection member, an external camera, and circuitry. The projection member includes a light source and is configured to project light for road surface rendering from the vehicle that is traveling to render a road surface rendered image on a road surface around the vehicle. The external camera is provided on the vehicle and configured to capture an image of the road surface so that the image includes surroundings of the road surface rendered image. The circuitry is configured to control light projection for the road surface rendering by the projection member, and suppress the light projection from the projection member for the road surface rendered image by making determination on a road surface reflection state based on the image captured by the external camera.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

It is not always appropriate to simply render a road surface rendered image on a road surface by projecting light from a vehicle.

For example, if the road surface totally reflects light, the majority of the light projected from the vehicle for the road surface rendering is reflected toward an oncoming vehicle or the like. In this case, there is a possibility that a driver of a preceding vehicle traveling ahead of the vehicle or a driver of the oncoming vehicle is irradiated with intense light via the road surface.

It is desirable to improve the road surface rendering from the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
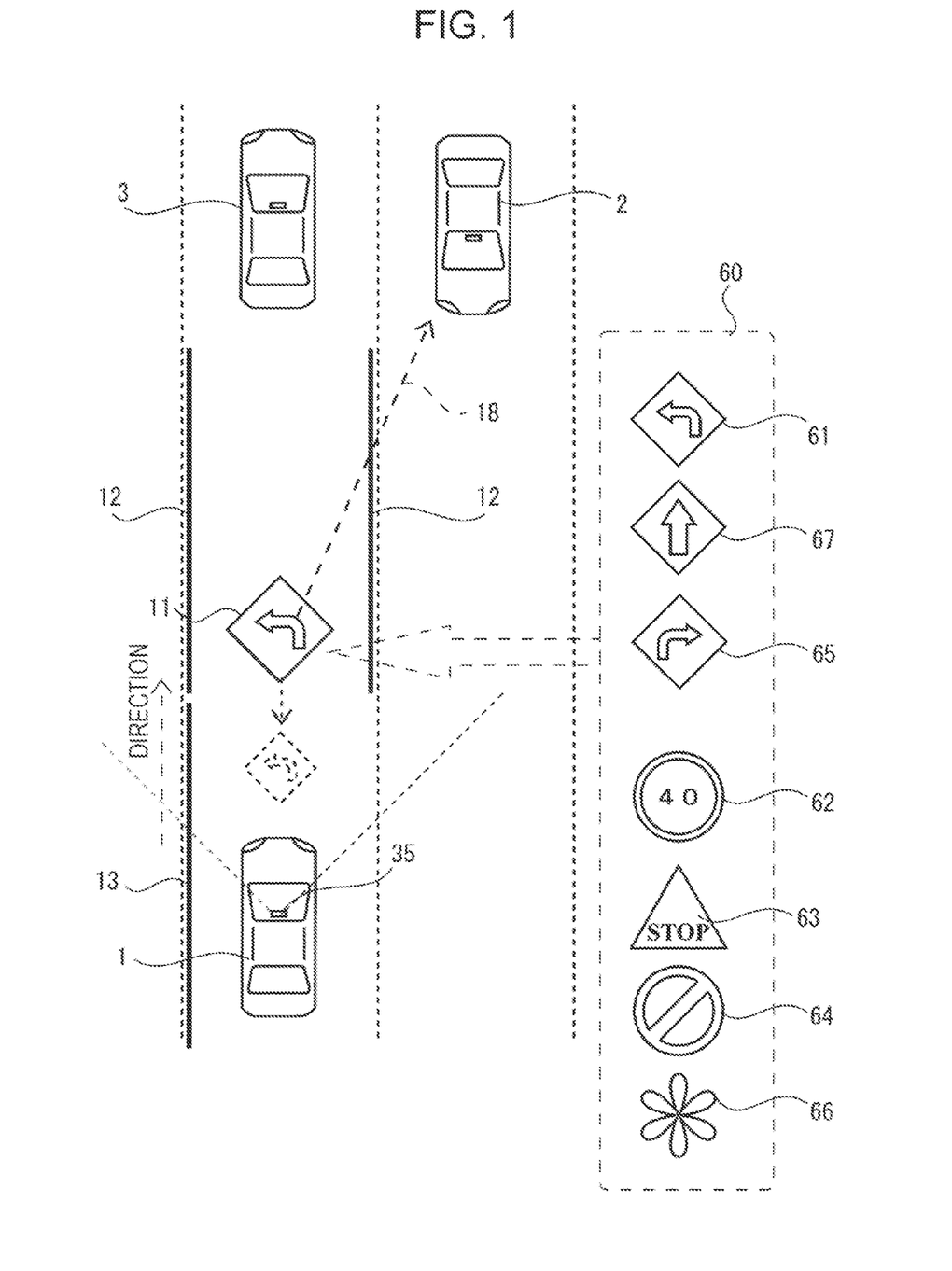
FIG. 1 illustrates an example of a traveling condition of a vehicle according to an embodiment of the disclosure.

FIG. 1 illustrates an example of a traveling condition of a vehicle 1 such as an automobile according to a first embodiment of the disclosure.

FIG. 1 illustrates the vehicle 1 traveling along a road having one lane on one side. The automobile is an example of the vehicle 1. Examples of the vehicle 1 also include a bus, a truck, a motorcycle, and personal mobility. The vehicle 1 may travel by autonomous driving including drive assist.

On the road, a preceding vehicle 3 is traveling ahead of the vehicle 1. An oncoming vehicle 2 is traveling along an oncoming lane of the road.

In such a traveling environment, a driver of the vehicle 1 drives the vehicle 1 so as to prevent lane departure on the road while paying attention to, for example, a forward side in a traveling direction of the vehicle 1. In a dark traveling environment, the vehicle 1 may turn ON headlamps. An external camera 35 described later is provided at the front in a cabin of the vehicle 1. A windshield is provided in front of the external camera 35.

Research and development have been promoted on drawing a picture by radiating visible light onto a road surface from the vehicle 1.

For example, FIG. 1 illustrates a road surface rendered image 11 showing a simple picture of a traffic sign, lane making lines 12 extending along right and left sides of a currently traveling lane, and a road shoulder marking line 13 drawn on the side of the vehicle near a road shoulder. The road surface rendered image 11 is rendered ahead of the vehicle in its traveling direction for the driver of the vehicle. The lane making lines 12 and the road shoulder marking line 13 are drawn for a pedestrian on the road shoulder or for the oncoming vehicle 2.

On the right side of FIG. 1, projection patterns 60 serving as the road surface rendered image 11 are illustrated. FIG. 1 exemplifies a left turn projection pattern 61, a straightforward projection pattern 67, a right turn projection pattern 65, a speed limit projection pattern 62, a stop position projection pattern 63, a no-crossing projection pattern 64, and a projection pattern 66 using a pictogram for attention to snow or freezing. The vehicle 1 selects any one of the projection patterns 60 depending on the traveling condition or the traveling environment, and projects light corresponding to the selected projection pattern.

By rendering the pattern of the road surface rendered image 11 or the like on the road surface, the vehicle 1 can provide, for example, its driver with information on traveling of the vehicle 1 via the road surface.

It is not always appropriate to simply render the road surface rendered image 11 on the road surface by projecting light from the vehicle 1.

For example, if the road surface totally reflects light of the road surface rendered image 11, the majority of the light is reflected toward the oncoming vehicle or the like. In this case, there is a possibility that the driver of the preceding vehicle 3 traveling ahead of the vehicle or the driver of the oncoming vehicle 2 is irradiated with intense light via the road surface.

The road surface is likely to cause total reflection, for example, when it is wet due to rain. When the road surface rendered image 11 is rendered in this state, there is a possibility that a part of the light of the road surface rendered image 11 is radiated to, for example, the driver of the oncoming vehicle 2 as indicated by an arrow 18 in FIG. 1.

It is desirable to improve the road surface rendering from the vehicle.

Figure 2:
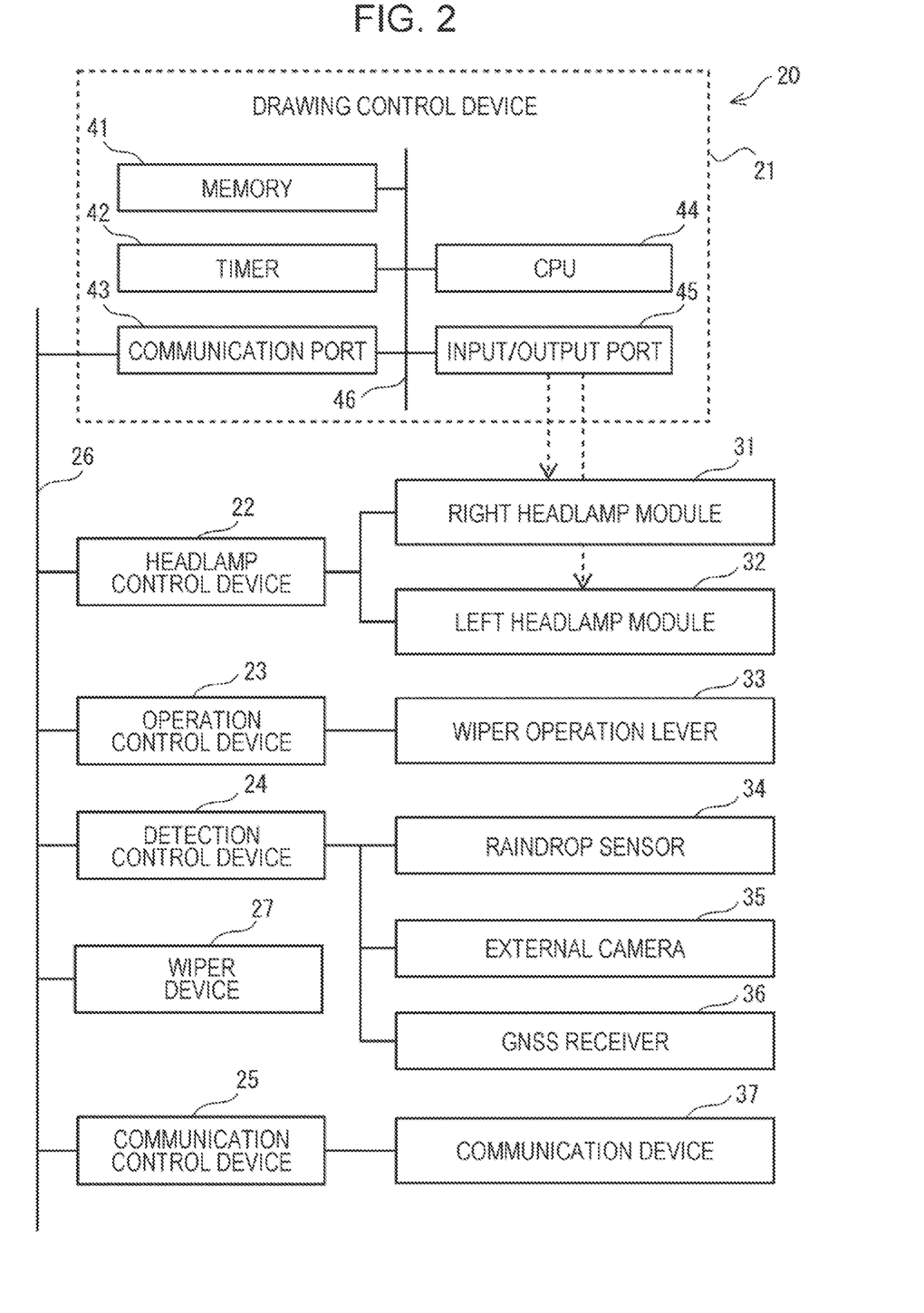
FIG. 2 illustrates a control system provided in the vehicle of FIG. 1.

FIG. 2 illustrates a control system 20 provided in the vehicle 1 of FIG. 1.

The control system 20 of the vehicle 1 of FIG. 2 includes control devices and a vehicle network 26 to which the control devices are coupled.

For example, the vehicle network 26 may be a wired communication network conforming to a controller area network (CAN) or a local interconnect network (LIN) for the vehicle 1. The vehicle network 26 may be a communication network such as a LAN or a combination of those networks. The vehicle network 26 may partly include a wireless communication network. The various devices coupled to the vehicle network 26 can exchange information via the vehicle network 26.

FIG. 2 illustrates a rendering control device 21, a headlamp control device 22, an operation control device 23, a detection control device 24, a communication control device 25, and a wiper device 27 as examples of the control devices.

Other control devices such as a traveling control device and an air conditioning control device may be coupled to the vehicle network 26. Each control device illustrated in FIG. 2 may be coupled to the vehicle network 26 while being divided into multiple parts.

A right headlamp module 31 and a left headlamp module 32 provided at the front end of the vehicle 1 are coupled to the headlamp control device 22. The right headlamp module 31 and the left headlamp module 32 are headlamp members that project light forward from the vehicle 1.

The right headlamp module 31 and the left headlamp module 32 of this embodiment include projection modules 53 for road surface rendering as described later. In one embodiment, the projection module 53 of the right headlamp module 31 and the projection module 53 of the left headlamp module 32 may serve as a projection member configured to project light for road surface rendering from the traveling vehicle 1 to render the road surface rendered image 11 on a road surface around the traveling vehicle 1. That is, the projection member may include a light source.

The headlamp control device 22 controls a lighting status of the right headlamp module 31 and a lighting status of the left headlamp module 32 based on information acquired via the vehicle network 26 about an operation on a lamp operation lever (not illustrated) and a detection value from an automatic light intensity sensor (not illustrated). With the lamp operation lever, an operation state such as "low beam", "high beam", or "OFF" can be set in general.

The headlamp control device 22 may output information on the lighting statuses of the right headlamp module 31 and the left headlamp module 32 to other control devices via the vehicle network 26.

Various operation members to be operated by an occupant such as the driver are coupled to the operation control device 23. FIG. 2 exemplifies a wiper operation lever 33 as the operation member. The wiper operation lever 33 is used for operating the wiper device 27 that wipes the outer surface of the windshield of the vehicle 1. With the wiper operation lever 33, an operation state such as "intermittent drive", "continuous drive", "high-speed continuous drive", or "OFF" can be set in general.

The operation control device 23 may output information on the operation states of the various operation members such as the wiper operation lever 33 to other control devices such as the wiper device 27 via the vehicle network 26.

When the wiper operation lever 33 is operated, the wiper device 27 wipes the outer surface of the windshield of the vehicle 1. The wiper device 27 removes, from the outer surface of the windshield of the vehicle 1, dust or raindrops adhering to the outer surface of the windshield.

Various detection members that detect the traveling condition and the traveling environment of the vehicle 1 are coupled to the detection control device 24. FIG. 2 exemplifies a raindrop sensor 34, the external camera 35, and a global navigation satellite system (GNSS) receiver 36 as the detection members.

The detection control device 24 may output, for example, detection information from the raindrop sensor 34 to other control devices via the vehicle network 26.

The raindrop sensor 34 is provided on the outer surface of the windshield of the vehicle 1, and can detect whether there is rainfall and the amount of rainfall based on a change in electric conduction depending on wetness of the raindrop sensor 34 due to raindrops.

As illustrated in FIG. 1, the external camera 35 is oriented forward in the cabin on the inner side of the windshield of the vehicle 1. The external camera 35 can capture an image of a forward view in the traveling direction of the vehicle 1. The vehicle 1 may include multiple external cameras 35. The external cameras 35 may capture images separately around the vehicle 1. The external camera 35 may be a 360-degree camera or a stereo camera.

The image captured by the external camera 35 may include, as its detection image, an image rendered by projecting light onto a road surface.

In addition to the external camera 35, a lidar, a laser, or the like can detect the surroundings of the vehicle 1. Detection information from the lidar or the laser can be used as the information on the surroundings of the vehicle 1 similarly to the image captured by the external camera 35.

In one embodiment, the external camera 35, the lidar, the laser, or the like provided to the vehicle 1 may serve as a detection device configured to detect a road surface where the road surface rendered image 11 is projected. That is, the detection device may include a sensor.

The external camera 35, the lidar, the laser, or the like can detect the road surface in a detection range wider than a projection range on the road surface where the road surface rendered image 11 is projected.

The GNSS receiver 36 receives radio waves from GNSS satellites to detect information on time and the position of the vehicle 1 including the GNSS receiver 36.

A communication device 37 is coupled to the communication control device 25. The communication device 37 exchanges information with a server device via a base station (not illustrated) or the like. Examples of the base station include a 5G base station and a base station for advanced driver assistance systems (ADAS) or intelligent transport systems (ITS). Some 5G base stations may have functions of a server device. The communication device 37 may directly communicate with other vehicles or the like by vehicle-to-X (V2X) communication.

The communication control device 25 may transmit information acquired via the vehicle network 26 from the communication device 37 to a base station or a server device, or may output, to the vehicle network 26, information received by the communication device 37 from a base station or a server device.

The rendering control device 21 includes a memory 41, a timer 42, a communication port 43, an input/output port 45, a CPU 44, and an internal bus 46 to which those components are coupled. The control devices provided in the control system 20 basically have structures similar to that of the rendering control device 21.

The right headlamp module 31 and the left headlamp module 32 are coupled to the input/output port 45.

The communication port 43 is coupled to the vehicle network 26. The communication port 43 acquires information from the vehicle network 26, and outputs, to the vehicle network 26, information to be output by the rendering control device 21.

The timer 42 measures a period or time. The time of the timer 42 may be calibrated by the time of the GNSS receiver 36.

For example, the memory 41 may include a semiconductor memory, a hard disk drive (HDD), and a random access memory (RAM). The HDD is a non-volatile memory. The RAM is a volatile memory. The memory 41 records programs to be executed by the CPU 44 and various types of information to be used during execution of the programs as data. For example, the memory 41 records data on the projection patterns 60 illustrated in FIG. 1.

The CPU 44 reads and executes the programs recorded in the memory 41. Therefore, the CPU 44 serves as a controller of the rendering control device 21. In one embodiment, the CPU 44 may serve as a controller configured to control light projection for the road surface rendering by the projection modules 53 and 53.

The CPU 44 controls the operation of the rendering control device 21. The CPU 44 outputs signals to the right headlamp module 31 and the left headlamp module 32 via the communication port 43. In this way, the CPU 44 controls the projection modules 53 provided in the right headlamp module 31 and the left headlamp module 32 for the road surface rendering. The right headlamp module 31 and the left headlamp module 32 are lit in a projection pattern for the road surface rendering. For example, as illustrated in FIG. 1, the road surface rendered image 11 corresponding to the projection pattern may be rendered on the road surface.

In this way, the CPU 44 can control the light projection for the road surface rendering by the projection modules 53 and 53 based on the detection (captured image) by the external camera 35 that may serve as the detection device.

Figure 3:
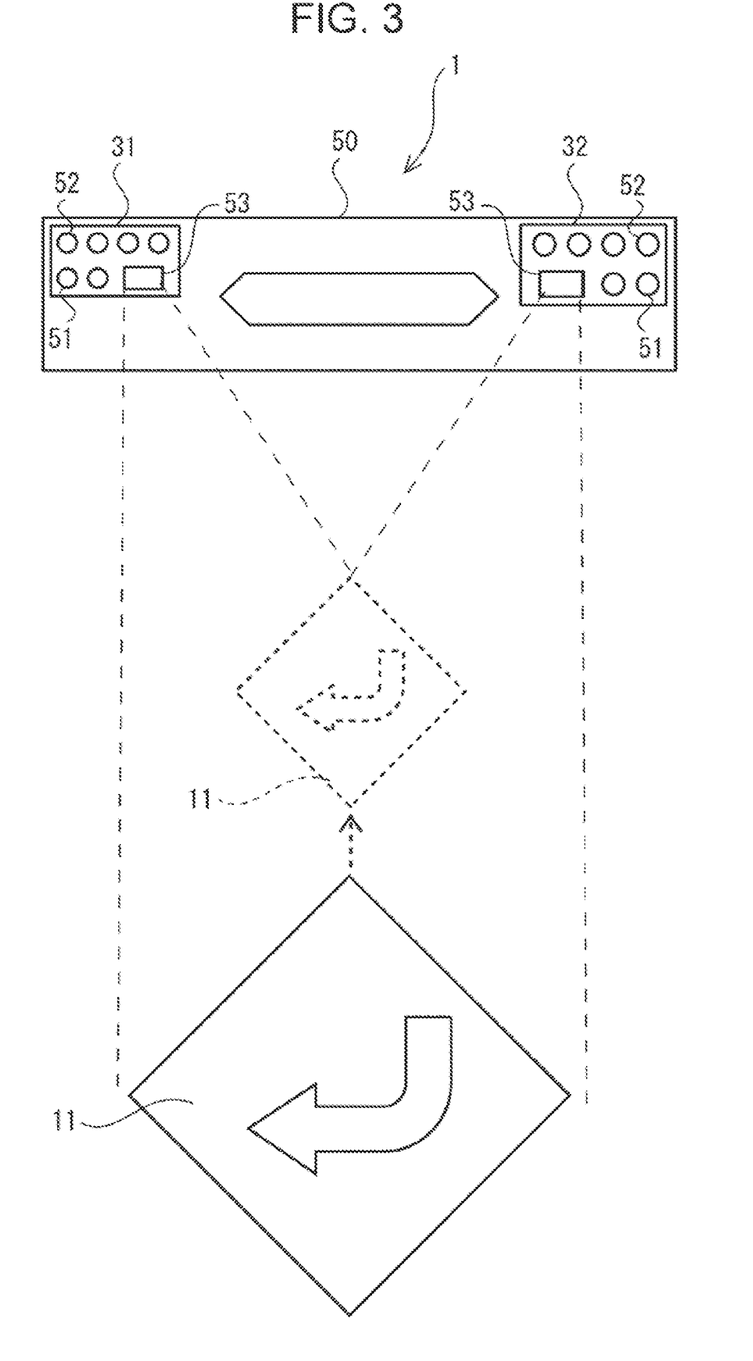
FIG. 3 schematically illustrates the structure and disposition of a right headlamp module and a left headlamp module at the front end of the vehicle of FIG. 1.

FIG. 3 schematically illustrates the structure and disposition of the right headlamp module 31 and the left headlamp module 32 at the front end of the vehicle 1 of FIG. 1.

FIG. 3 illustrates the front end of the vehicle 1.

The right headlamp module 31 is provided at the right front end of the vehicle 1. The right headlamp module 31 includes low-beam light emitting diodes (LEDs) 51, high-beam LEDs 52, and the micro electro mechanical systems (MEMS) projection module 53.

The left headlamp module 32 is provided at the left front end of the vehicle 1. The left headlamp module 32 includes low-beam LEDs 51, high-beam LEDs 52, and the MEMS projection module 53.

For example, the projection module 53 may be a digital micromirror device (DMD).

For example, the MEMS projection module 53 projects light by reflecting light from a three-color light source by MEMS elements. The reflection state of each MEMS element may be controlled based on an image signal.

The right headlamp module 31 or the left headlamp module 32 may use a device that can render an image on a road surface, except for the MEMS projection module 53.

The MEMS projection module 53 may project light inside and outside the radiation range of the low-beam LEDs 51 and the high-beam LEDs 52 as a whole. A part of the no-crossing rendered pattern for a pedestrian in FIG. 1 is outside the radiation range of the low-beam LEDs 51 and the high-beam LEDs 52 as a whole.

In FIG. 3, the MEMS projection modules 53 of the right headlamp module 31 and the left headlamp module 32 project light in cooperation to render a right turn road surface rendered image 11 corresponding to the right turn projection pattern 65 on a road surface. The road surface rendered image 11 can be rendered at different positions as illustrated in FIG. 3 within a range in which the two projection modules 53 and 53 can project light. The position and size of the road surface rendered image 11 can be changed within the range in which the two projection modules 53 and 53 can project light. In FIG. 3, the broken lines indicate a state in which the position of the road surface rendered image 11 is made closer to the vehicle 1 from a normal projection position. The road surface rendered image 11 close to the vehicle 1 has a smaller size than that at the normal projection position.

In FIG. 3, the MEMS projection module 53 of the right headlamp module 31 and the MEMS projection module 53 of the left headlamp module 32 may individually rendered road surface rendered images 11 on the road surface.

The CPU 44 controls the MEMS projection module 53 of the right headlamp module 31 and the MEMS projection module 53 of the left headlamp module 32 based on the projection pattern to render the road surface rendered image 11 corresponding to the projection pattern on the road surface. In one embodiment, the MEMS projection module 53 of the right headlamp module 31 and the MEMS projection module 53 of the left headlamp module 32 may serve as the projection member configured to project the road surface rendered image 11 based on the projection pattern.

Figure 4:
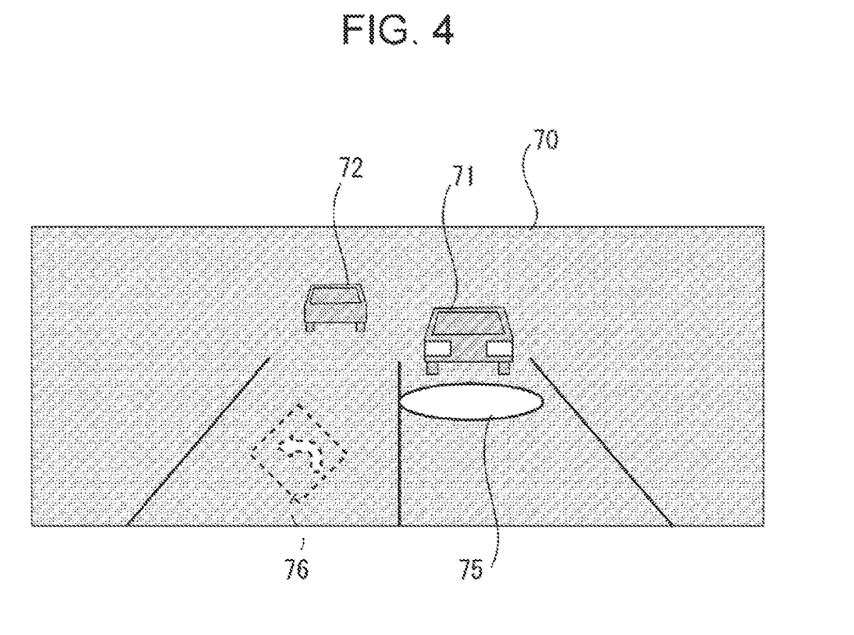
FIG. 4 illustrates an image captured by an external camera of FIG. 2.

FIG. 4 illustrates an image 70 captured by the external camera 35 of FIG. 2.

The image 70 of FIG. 4 is captured by the external camera 35 of the traveling vehicle 1 of FIG. 1. In FIG. 4, the CPU 44 does not cause the projection modules 53 and 53 to project light.

Therefore, the captured image 70 of FIG. 4 includes an image 71 of the oncoming vehicle 2 and an image 72 of the preceding vehicle 3 together with the road where the vehicle 1 is traveling. Since the captured image 70 shows nighttime, the oncoming vehicle 2 lights its headlamps. Road surface glare 75 caused by the headlamps is present ahead of the oncoming vehicle 2.

When the vehicle 1 projects light for the road surface rendering in this state, the captured image 70 includes a detection image 76 corresponding to the road surface rendered image 11 as indicated by broken lines in FIG. 4.

The external camera 35 of the vehicle 1 can capture an image of the road surface so that the image includes the road surface around the road surface rendered image 11.

Figure 5:
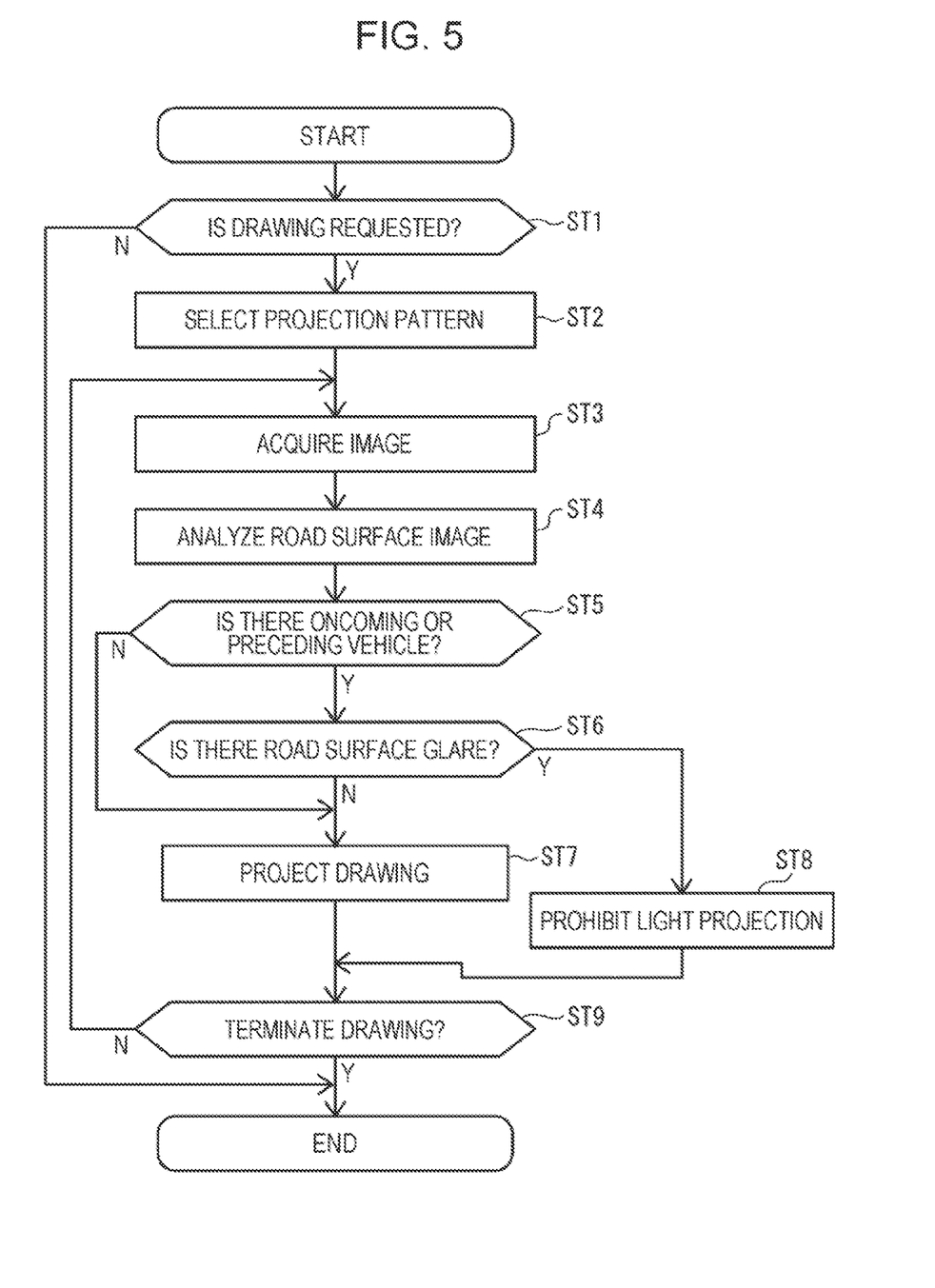
FIG. 5 is a flowchart of road surface rendering control of the embodiment to be executed by a rendering control device of FIG. 2.

FIG. 5 is a flowchart of road surface rendering control of the first embodiment to be executed by the rendering control device 21 of FIG. 2.

The CPU 44 of the rendering control device 21 repeats the road surface rendering control of FIG. 5.

In one embodiment, if the headlamp control device 22 has a rendering control function in the control system 20, a CPU of the headlamp control device 22 may serve as the controller to repeat the road surface rendering control of FIG. 5.

In Step ST1, the CPU 44 that controls light projection for road surface rendering determines whether the road surface rendering is requested. The request for the road surface rendering may be generated by various control devices of the control system 20. For example, when lighting the headlamps, the headlamp control device 22 may generate information for requesting the road surface rendering and output the information to the rendering control device 21 via the vehicle network 26. When the road surface rendering is requested, the CPU 44 advances the process to Step ST2. When the road surface rendering is not requested, the CPU 44 terminates this control.

In Step ST2, the CPU 44 selects a projection pattern to be used for the road surface rendering from among the projection patterns 60 recorded in the memory 41. The CPU 44 may select multiple projection patterns.

In Step ST3, the CPU 44 acquires the latest captured image 70 from the external camera 35.

In Step ST4, the CPU 44 analyzes the captured image 70 acquired in Step ST3.

When the captured image 70 includes, for example, the image 72 of the preceding vehicle 3 and the image 71 of the oncoming vehicle 2 through the image analysis, the CPU 44 may extract those images.

When the captured image 70 includes the road surface glare 75 caused by the headlamps of the oncoming vehicle 2 or the like through the image analysis, the CPU 44 may extract the road surface glare 75.

In Step ST5, the CPU 44 determines whether the oncoming vehicle 2 or the preceding vehicle 3 is present in the image 70 captured by the external camera 35.

When the image 72 of the preceding vehicle 3 or the image 71 of the oncoming vehicle 2 is extracted from the captured image 70 through the image analysis, the CPU 44 determines that the oncoming vehicle 2 or the preceding vehicle 3 is present in the image 70 captured by the external camera 35, and advances the process to Step ST6.

When neither the image 72 of the preceding vehicle 3 nor the image 71 of the oncoming vehicle 2 is extracted from the captured image 70 through the image analysis, the CPU 44 determines that neither the oncoming vehicle 2 nor the preceding vehicle 3 is present in the image 70 captured by the external camera 35, and advances the process to Step ST7.

In Step ST6, the CPU 44 determines whether the road surface glare 75 is present in the image 70 captured by the external camera 35.

When the road surface glare 75 is extracted from the captured image 70 through the image analysis, the CPU 44 determines that the road surface glare 75 is present in the image 70 captured by the external camera 35, and advances the process to Step ST8.

When the road surface glare 75 is not extracted in the captured image 70 through the image analysis, the CPU 44 determines that the road surface glare 75 is not present in the image 70 captured by the external camera 35, and advances the process to Step ST7.

When the oncoming vehicle 2 or the preceding vehicle 3 is present in the captured image 70, the CPU 44 determines whether the road surface glare 75 caused by the oncoming vehicle 2 or the preceding vehicle 3 is present in the captured image 70 as a road surface reflection state.

In Step ST7, the CPU 44 controls the projection module 53 of the right headlamp module 31 and the projection module 53 of the left headlamp module 32 to irradiate a road surface with light in the projection pattern selected in Step ST2. Thus, a road surface rendered image 11 corresponding to the projection pattern is rendered on the road surface.

When neither the oncoming vehicle 2 nor the preceding vehicle 3 is present or when the road surface glare 75 is not caused though the oncoming vehicle 2 or the like is present, the CPU 44 causes the projection modules 53 to project the light for the road surface rendered image normally. That is, when the road surface glare 75 is not present though the oncoming vehicle 2 or the preceding vehicle 3 is present, for example, the CPU 44 does not suppress the light projection from the projection modules 53 for the road surface rendered image 11.

Then, the CPU 44 advances the process to Step ST9.

In Step ST8, the CPU 44 controls the projection module 53 of the right headlamp module 31 and the projection module 53 of the left headlamp module 32 to prohibit the light projection for the road surface rendered image.

When the road surface glare 75 caused by the oncoming vehicle 2 or the preceding vehicle 3 is present, the CPU 44 prohibits the light projection from the projection modules 53 for the road surface rendered image 11.

In Step ST9, the CPU 44 determines whether to terminate the rendering. The CPU 44 may determine to terminate the road surface rendering, for example, when the road surface rendering is not requested. In this case, the CPU 44 terminates this control.

For example, when the road surface rendering is still requested, the CPU 44 determines not to terminate the road surface rendering, and returns the process to Step ST3. In this case, the CPU 44 repeats the process from Step ST3 to Step ST9 to continue the control for the road surface rendering.

As described above, the CPU 44 can suppress the light projection from the projection modules 53 for the road surface rendered image 11 by making determination on the road surface reflection state based on the image 70 captured by the external camera 35.

After the suppression of the light projection from the projection modules 53 for the road surface rendered image 11, the CPU 44 can stop the suppression and resume the light projection from the projection modules 53 by repeating the road surface rendering control of FIG. 5. For example, the CPU 44 can resume the light projection from the projection modules 53 for the road surface rendered image 11 when the road surface glare 75 caused by the oncoming vehicle 2 or the preceding vehicle 3 is not present in the image 70 captured by the external camera 35.

As described above, the vehicle 1 according to this embodiment includes the external camera 35. The external camera 35 can capture the image of the road surface so that the image includes not only the road surface rendered image 11 but also the road surface around the road surface rendered image 11. The CPU 44 that controls the light projection for the road surface rendering by the projection modules 53 suppresses the light projection from the projection modules 53 for the road surface rendered image 11 by making determination on the road surface reflection state based on the image 70 captured by the external camera 35.

In this embodiment, when the road surface is not suited to the light projection for the road surface rendered image 11 due to the glare, determination is made on this situation based on the image 70 captured by the external camera 35. Thus, the light projection for the road surface rendered image 11 can be stopped.

In this embodiment, the improvement in the road surface rendering from the vehicle 1 can be expected by controlling the light projection for the road surface rendering.

Second Embodiment

Next, description is made about a road surface rendering device of a vehicle 1 according to a second embodiment of the disclosure.

This embodiment is directed to an example in which the light projection for the road surface rendering is maintained to the extent possible by road surface rendering control different from that in the embodiment described above.

The differences from the embodiment described above are mainly described below.

Figure 6:
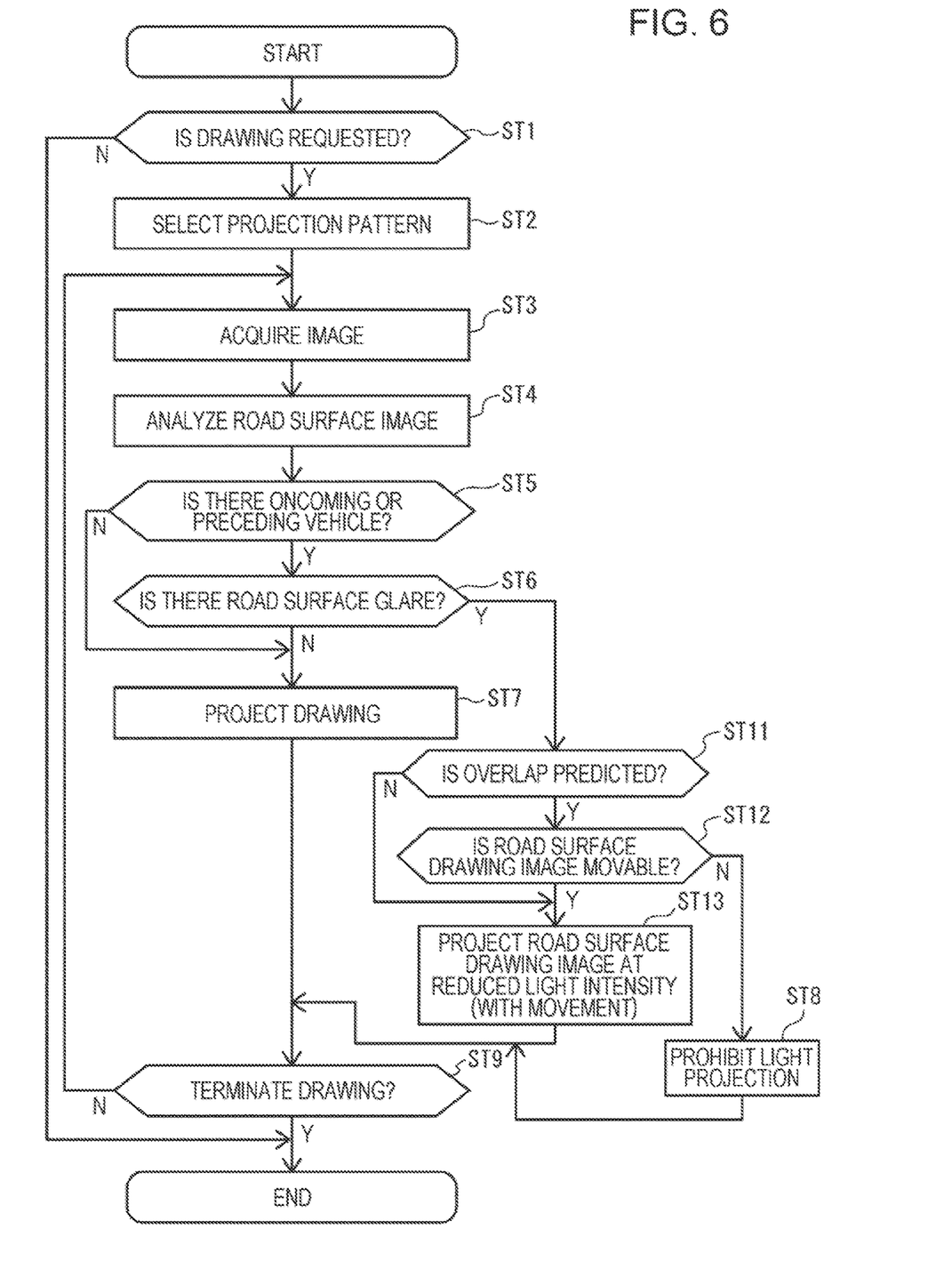
FIG. 6 is a flowchart of road surface rendering control of an embodiment to be executed by the rendering control device of FIG. 2.

FIG. 6 is a flowchart of the road surface rendering control of the second embodiment to be executed by the rendering control device 21 of FIG. 2.

The CPU 44 of the rendering control device 21 repeats the road surface rendering control of FIG. 6.

If the headlamp control device 22 has the rendering control function in the control system 20, the CPU of the headlamp control device 22 may repeat the road surface rendering control of FIG. 6.

Step ST1 to Step ST7 are similar to those in the embodiment described above.

When determination is made that the road surface glare 75 is present in Step ST6, the CPU 44 advances the process to Step ST11.

When the road surface glare 75 caused by the oncoming vehicle 2 or the preceding vehicle 3 is present, the CPU 44 determines in Step ST11 whether the road surface rendered image 11 and the road surface glare 75 are predicted to overlap each other.

For example, in the captured image of FIG. 4, the road surface glare 75 due to the headlamps of the oncoming vehicle 2 occurs in the oncoming lane where the oncoming vehicle 2 is traveling. The road surface rendered image 11 is in the lane where the vehicle 1 is traveling. In this case, the road surface rendered image 11 and the road surface glare 75 do not overlap each other even when the vehicle 1 travels ahead. In this case, the CPU 44 may determine that the road surface rendered image 11 and the road surface glare 75 do not overlap each other.

When the road surface glare due to the oncoming vehicle 2 occurs in the lane where the vehicle 1 is traveling unlike FIG. 4, at least a part of the road surface rendered image 11 and the road surface glare 75 may overlap each other when the vehicle 1 travels ahead. In this case, the CPU 44 may determine that the road surface rendered image 11 and the road surface glare 75 are predicted to overlap each other.

When the road surface rendered image 11 and the road surface glare 75 are predicted to overlap each other, the CPU 44 advances the process to Step ST12.

When the road surface rendered image 11 and the road surface glare 75 are predicted not to overlap each other, the CPU 44 advances the process to Step ST13.

When the road surface rendered image 11 and the road surface glare 75 overlap each other, the CPU 44 determines in Step ST12 whether the road surface rendered image 11 is movable.

As illustrated in FIG. 1 or FIG. 3, the road surface rendered image 11 is basically movable within the range in which the two projection modules 53 and 53 can project light. Particularly when the road surface rendered image 11 is moved closer to the vehicle 1, the road surface rendered image 11 can be rendered with high reflectivity while reducing the light intensities of the two projection modules 53 and 53. Even when the size of the road surface rendered image 11 close to the vehicle 1 is set smaller than that of the road surface rendered image 11 located away from the vehicle 1, the driver of the vehicle 1 is unlikely to have difficulty in viewing the road surface rendered image 11.

For example, when the position of the road surface rendered image 11 is movable from the normal position to the position close to the vehicle 1, the CPU 44 may determine that the road surface rendered image 11 is movable. In this case, the CPU 44 advances the process to Step ST13.

When there is no room to move the position of the road surface rendered image 11 from the normal position to the position close to the vehicle 1, the CPU 44 determines that the road surface rendered image 11 is not movable, and advances the process to Step ST8. In Step ST8, the CPU 44 controls the projection module 53 of the right headlamp module 31 and the projection module 53 of the left headlamp module 32 to prohibit the light projection for the road surface rendered image. Then, the CPU 44 advances the process to Step ST9.

In Step ST13, the CPU 44 moves the position of the road surface rendered image 11 from the normal position to the position close to the vehicle 1, reduces the size of the road surface rendered image 11 compared with the normal size, and causes the two projection modules 53 and 53 to project light. The CPU 44 reduces the light intensities of the two projection modules 53 and 53. In this case, the road surface rendered image 11 is rendered on the road surface near the vehicle 1 with reduced light intensity and size as illustrated in FIG. 1 or FIG. 3. The road surface rendered image 11 reduced in light intensity and size and located nearby is unlikely to irradiate the driver of the oncoming vehicle 2 or the driver of the preceding vehicle 3 with intense light compared with the normal road surface rendered image 11.

In this embodiment described above, when the road surface rendered image 11 and the road surface glare 75 are predicted not to overlap each other, the CPU 44 can suppress the light projection from the projection modules 53 for the road surface rendered image 11 by reducing the light intensity. Thus, the road surface rendered image 11 can be maintained.

When the road surface rendered image 11 and the road surface glare 75 are predicted to overlap each other, the CPU 44 prohibits the light projection from the projection modules 53 for the road surface rendered image 11.

In this embodiment, when the road surface rendered image 11 is movable closer to the vehicle 1, the CPU 44 can suppress the light projection from the projection modules 53 for the road surface rendered image 11 by moving the position of the light projection from the normal position to the position close to the vehicle 1 and reducing the light intensity. Thus, the road surface rendered image 11 can be maintained.

When the position of the light projection for the road surface rendered image 11 is not movable to the position close to the vehicle 1, the CPU 44 prohibits the light projection from the projection modules 53 for the road surface rendered image 11.

The embodiments described above are exemplary embodiments of the disclosure but are not limitative, and various modifications or alterations may be made without departing from the scope disclosed herein.

In the embodiments described above, the projection module 53 is provided in the vehicle 1 while being integrated with the headlamp LEDs 51 and 52 in the right headlamp module 31 or the left headlamp module 32.

For example, the projection module 53 may be provided in the vehicle 1 separately from the right headlamp module 31 or the left headlamp module 32.

The vehicle 1 may include one, three, or more projection modules 53. The one projection module 53 or the third projection module 53 may be provided at the center of the front part of the vehicle in a width direction.

The vehicle according to the embodiments of the disclosure includes the external camera. The external camera can capture the image of the road surface so that the image includes the road surface around the road surface rendered image. The controller that controls the light projection for the road surface rendering by the projection member suppresses the light projection from the projection member for the road surface rendered image by making determination on the road surface reflection state based on the image captured by the external camera.

In the embodiments of the disclosure, when the road surface is not suited to the light projection for the road surface rendered image, determination is made on this situation based on the road surface reflection state in the image captured by the external camera. Thus, the light projection for the road surface rendered image can be suppressed.

According to the disclosure, the improvement in the road surface rendering from the vehicle can be expected by controlling the light projection for the road surface rendering.

The rendering control device 21 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the rendering control device 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle with a road surface rendering function, the vehicle comprising:
a projection member configured to project light for road surface rendering from the vehicle that is traveling to render a road surface rendered image on a road surface around the vehicle;
a controller configured to control light projection for the road surface rendering by the projection member; and
an external camera provided on the vehicle and configured to capture an image of the road surface so that the image includes surroundings of the road surface rendered image,
wherein the controller is configured to suppress the light projection from the projection member for the road surface rendered image by making determination on a road surface reflection state based on the image captured by the external camera,
wherein the controller is configured to:
determine whether an oncoming vehicle or a preceding vehicle is present in the image captured by the external camera,
when the oncoming vehicle or the preceding vehicle is present in the captured image, determine whether road surface glare caused by the oncoming vehicle or the preceding vehicle is present in the captured image as the road surface reflection state,
when the road surface glare caused by the oncoming vehicle or the preceding vehicle is present, prohibit the light projection from the projection member for the road surface rendered image, and
when the oncoming vehicle or the preceding vehicle is present and the road surface glare is not present, avoid suppressing the light projection from the projection member for the road surface rendered image.

2. The vehicle with the road surface rendering function according to claim 1, wherein the controller is configured to when the road surface glare caused by the oncoming vehicle or the preceding vehicle is present, determine whether the road surface rendered image and the road surface glare overlap each other,
when the road surface rendered image and the road surface glare do not overlap each other, suppress the light projection from the projection member for the road surface rendered image by reducing a light intensity, and when the road surface rendered image and the road surface glare overlap each other, prohibit the light projection from the projection member for the road surface rendered image.

3. The vehicle with the road surface rendering function according to claim 2, wherein the controller is configured to when the road surface rendered image and the road surface glare overlap each other, determine whether the road surface rendered image is movable, when the road surface rendered image is movable, suppress the light projection from the projection member for the road surface rendered image by reducing the light intensity, and when the road surface rendered image is not movable, prohibit the light projection from the projection member for the road surface rendered image.

4. The vehicle with the road surface rendering function according to claim 1, wherein the controller is configured to, after suppressing the light projection from the projection member for the road surface rendered image, stop suppressing suppression the light projection from the projection member for the road surface rendered image, and when the road surface glare caused by the oncoming vehicle or the preceding vehicle is not present in the image captured by the external camera, resume the light projection from the projection member.

5. The vehicle with the road surface rendering function according to claim 2, wherein the controller is configured to, after suppressing the light projection from the projection member for the road surface rendered image, stop suppressing suppression the light projection from the projection member for the road surface rendered image, and when the road surface glare caused by the oncoming vehicle or the preceding vehicle is not present in the image captured by the external camera, resume the light projection from the projection member.

6. The vehicle with the road surface rendering function according to claim 3, wherein the controller is configured to, after suppressing the light projection from the projection member for the road surface rendered image, stop suppressing suppression the light projection from the projection member for the road surface rendered image, and when the road surface glare caused by the oncoming vehicle or the preceding vehicle is not present in the image captured by the external camera, resume the light projection from the projection member.

7. A vehicle with a road surface rendering function, the vehicle comprising:

a projection member including a light source and configured to project light for road surface rendering from the vehicle that is traveling to render a road surface rendered image on a road surface around the vehicle;

an external camera provided on the vehicle and configured to capture an image of the road surface so that the image includes surroundings of the road surface rendered image; and circuitry configured to control light projection for the road surface rendering by the projection member, and suppress the light projection from the projection member for the road surface rendered image by making determination on a road surface reflection state based on the image captured by the external camera, wherein the circuitry is configured to:

determine whether an oncoming vehicle or a preceding vehicle is present in the image captured by the external camera, when the oncoming vehicle or the preceding vehicle is present in the captured image, determine whether road surface glare caused by the oncoming vehicle or the preceding vehicle is present in the captured image as the road surface reflection state, when the road surface glare caused by the oncoming vehicle or the preceding vehicle is present, prohibit the light projection from the projection member for the road surface rendered image, and when the oncoming vehicle or the preceding vehicle is present and the road surface glare is not present, avoid suppressing the light projection from the projection member for the road surface rendered image.

\* \* \* \* \*